No. 644,647. Patented Mar. 6, 1900.
G. K. THOMPSON & E. C. ROBES.
SELECTIVE SIGNAL FOR TELEPHONE CIRCUITS.
(Application filed July 18, 1899.)
(No Model.)
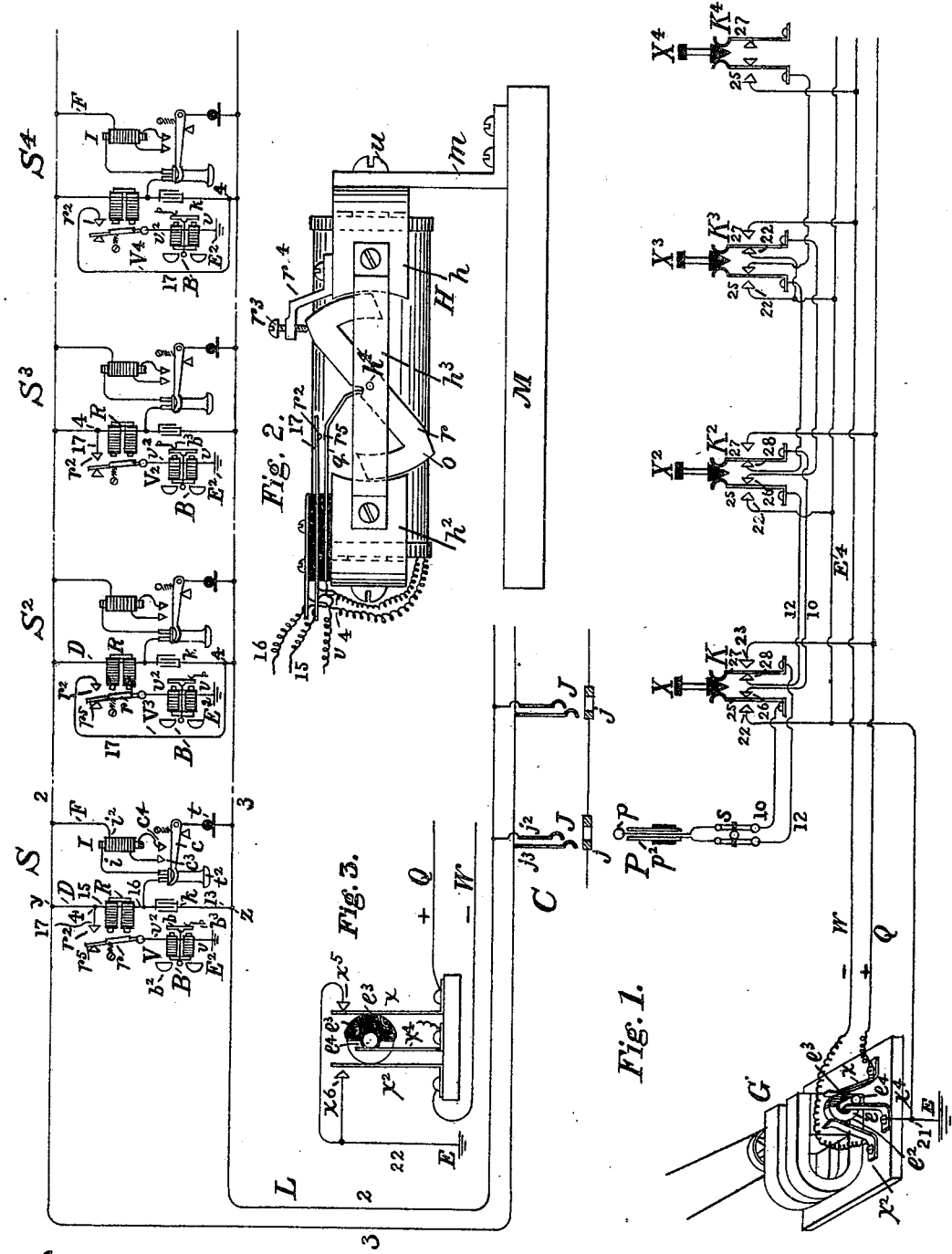
Attest,
Frank C. Lockwood,
Geo. Willis Price
Inventors
George K. Thompson
Ernest C. Robes

UNITED STATES PATENT OFFICE.

GEORGE K. THOMPSON, OF MALDEN, AND ERNEST C. ROBES, OF MEDFORD, MASSACHUSETTS, ASSIGNORS TO THE AMERICAN BELL TELEPHONE COMPANY, OF BOSTON, MASSACHUSETTS.

SELECTIVE SIGNAL FOR TELEPHONE-CIRCUITS.

SPECIFICATION forming part of Letters Patent No. 644,647, dated March 6, 1900.

Application filed July 18, 1899. Serial No. 724,235. (No model.)

*To all whom it may concern:*

Be it known that we, GEORGE K. THOMPSON, residing at Malden, and ERNEST C. ROBES, residing at Medford, in the county of Middlesex and State of Massachusetts, have invented certain Improvements in Selective Signals for Telephone-Circuits, of which the following is a specification.

This invention relates to selective signals for telephone-circuits, and in particular to that class wherein plus and minus currents may be transmitted at will over either or both conductors of a metallic circuit, the signal-receiving devices of the several stations being connected in branches to earth from the said main conductors, respectively. In organizations of this class heretofore permanently-connected earth branches have exclusively been employed, and it has therefore been impracticable for obvious reasons to arrange a four-station metallic circuit so fitted for operation in connection with a common battery or central-energy system of transmitter and incoming-call-signal current-supply.

The object of the present invention is to provide a system of selective signaling for association with four-party metallic telephone-circuits which, though involving the connection of the signaling instruments at the several substations in earth or ground branches from one or the other of the main-circuit conductors, shall have all of the said ground branches primarily detached or disconnected from their main-circuit conductors, respectively, but so arranged that they shall be fully available for use in connection with the said main conductors when a signal is to be selectively transmitted to any substation. In such a system the main circuit normally and when actually in use as a talking-circuit is maintained free from and untrammeled by earth connections, and is therefore in a condition of much higher efficiency than otherwise could be the case.

The system comprises a metallic main circuit extending between a central station and from one to four substations so arranged that in the latter case each main conductor of the circuit is provided with a normally-disunited ground branch and a polarized electromagnetic call-bell included therein at each of two of the substations, or, in other words, the polarized call-bell of each station is in a normally-detached earth branch, two of the said earth branches being associated with one main conductor and the remaining two with the other, and a relay-switch at each station connected in series with a condenser in a bridge between the main conductors controls the connection of the ground branch and the appropriate main conductor maintaining the normal severance when the circuit is at rest, uniting the branch to the main conductor while signals are being sent from the central station to any substation and again severing the branch from the main conductor after the signal has duly been transmitted.

The bridged relay at each substation is sluggish or slow in demagnetization and preferably has a delicately-balanced armature. It is a neutral relay—that is to say, non-polarized—and is so constructed that when a sufficiently-strong intermittent current of either direction is caused to pass through its electromagnet-coils its armature is attracted to its forward position and remains attracted as long as the transmission of such current continues.

One of the polarized bells of the two in the branches associated with each line conductor is responsive by the vibration of its armature, and consequently by the repeated oscillations of its bell-hammer, to an intermittent current of definite direction, while the armature of the bell in the other branch of the same main conductor is in like manner adapted to respond to a similar intermittent current, but of opposite polarity or direction. By this mode of connection it is evident that the two substation-bells of either main conductor can be selectively operated by sending intermittent currents of plus and minus direction, respectively, each in their own time over the said conductor, provided that the earth branches have first been united to their appropriate main conductors by the action of their associated relay-switches.

At the central station the signaling-circuit is associated with a suitable source of signaling-current and with means for connecting the same with either main conductor and for transmitting therefrom an intermittent current of either direction at will over the main conductor with which at any moment it is connected. One pole of the said source is during such transmission united to the said main conductor and the other is grounded, and means are provided whereby a shunt-circuit of low resistance is closed around the two bells associated with either main conductor whenever a signaling-current is being sent over the other main conductor for the operation of either of the bells thereof. Thus whenever a bell at either of the four substations is operated by the passage through its coils of an intermittent current of appropriate direction the other bell associated with the same main conductor is not rung, because for its operation an opposed direction of current is required, and the two bells associated with the other main conductor are not rung, for the reason that though their earth branches also are temporarily connected the electromagnets of both are shunted. Each bell therefore can at will be operated to the exclusion of the others.

In practice we prefer to employ a magneto-electric generator for the requisite source of current, the same being designed for the development of an alternating current and having one of its terminals grounded and the other connected with an analyzing-commutator having two brushes united to two supply-mains, respectively, the said brushes being so placed or adjusted that one of them receives for its supply-conductor the plus or positive impulse only of each alternating wave developed by a complete revolution of the armature, while the other receives for its supply-conductor the minus or negative impulse of the wave. By this means one of the said supply-conductors is made to receive an intermittent plus signaling-current and the other an intermittent minus-current. A set of signaling-keys is associated with this generator, each key of the said set corresponding to and controlling a particular and definite one of the substation-signals, two of the said keys being organized to connect one of the main conductors of the telephone-circuit with the plus and minus current-supply conductors, respectively, and in either case to simultaneously unite an earth connection to the other main conductor, and the remaining two keys being adapted to reverse the process and to connect the supply-conductors, respectively, with the second main conductor and to ground the first. The attachment of the said ground connection to the main conductor not immediately concerned in the signaling operation acts to establish the hereinbefore-mentioned shunt around the two call-bells thereof.

Obviously a battery and reversing-keys might, if desired, be employed in lieu of the magneto-generator and selective-keys, if similarly arranged for the connection of the ground to the inactive main conductor. Moreover, it is evident that by suitable switching mechanism one current-generator and one set of keys may be common to several independent telephone-circuits provided with independent earth branches and call-bells.

In the drawings accompanying this specification, Figure 1 is a diagram of a telephone party-line circuit having four substations fitted with selective signals and associated with central-station manipulating devices exemplifying this invention. Fig. 2 is a side elevation of a form of sluggish intermittent current-relay suitable for employment in connection with the said invention; and Fig. 3 shows a modification in the arrangement of the analyzing-commutator of the signal-current generator.

In Fig. 1, L is the main telephone-circuit, extending, as shown, between the central station C and four substations $S\ S^2\ S^3\ S^4$. It is a metallic or double conductor-circuit, and 2 and 3 represent the two conductors thereof, respectively. J J represent spring-jacks or switch-sockets wherewith it is provided in the switchboard at the central station, the number of such switch-sockets being dependent on the size of the switchboard or, more generally, upon the magnitude of the central station and the number of lines connected therewith. P is a switch-plug at the central station adapted for insertion into the said sockets through the guide-rings $j$ thereof, and when so inserted its two conducting-surfaces $p$ and $p^2$ engage the corresponding socket connections $j^2\ j^3$, respectively, thereby establishing union between the two main-circuit conductors 2 3 and the cord-circuit conductors 10 and 12.

At each substation is the usual normally-open telephone-bridge F, including, conductively, the secondary helix $i^2$ of the transmitter induction-coil I, and associated with a local circuit which, as shown, contains the transmitter-electrodes $t$, the telephone-receiver $t^2$, and the primary helix $i$ of said induction-coil. The receiver is shown as being supported on the hook of the usual telephone-switch $c$, which operates to close the telephone-bridge and local circuit when the receiver is taken from the hook and to re-open both when it is replaced thereon, $c^3$ being the switch-contact point for the bridge and $c^4$ for the primary circuit. The said local circuit is in part formed of a portion 13 of a separate bridge D, presently to be described, and is thus made to include a condenser $k$, contained in the said separate bridge and having functions in connection therewith. This arrangement of the substation telephone-bridge and local circuit is the one now generally adopted in standard common battery systems, and being familiar to persons skilled in the art needs no further remark, especially as it has no direct concern with the present invention.

At each substation in accordance with this invention the bridge D, to which reference has been made, extends between the main conductors 2 3 of the telephone-circuit, say, at points $z\ y$. It contains a slow discharging or demagnetizing neutral relay R, which is adapted to respond to the transmission over either conductor of the main circuit of an intermittent signaling-current by the attraction of its armature $r$ to the front stop $r^2$ thereof and by the steady maintenance of such attraction as long as the transmission of such intermittent current continues. Fig. 2 illustrates a form of relay which has been found convenient for this purpose and which operates satisfactorily. It is non-polarized and consists of a single spool H, having an iron core with right-angle pole-pieces $h\ h^2$, screwed to its two ends, respectively, the whole being mounted on a base M by means of a bracket $m$, to which the central core and spool are secured by one of the pole-piece screws $u$. The armature $r$ is Z-shaped and is delicately hung on an arbor $h^4$ on pivots or in bearings of a brass plate $h^3$, screwed to the pole-pieces, and of a similar plate placed immediately behind the first and similarly attached to the inner surfaces of said pole-pieces, one end $o$ of said armature being slightly heavier than the other to facilitate return to the original position on the discontinuance of the vitalizing-current. The back-stop $r^3$ of the armature of this relay is supported in a small bracket $r^4$, mounted on one of the pole-pieces, and the bridge and branch conductor terminal springs may, as shown, be attached to the other pole-piece. The bridge-wires 15 and 16 include between them the coil of the relay, and from the point 4 of conductor 15 a branch 17 in the form of a contact-spring extends toward the center of the relay and is provided near its end with a contact-point $r^2$ within range of but normally out of contact with a complementary point $r^5$, carried by another spring $q$, which at its fixed end is united to a branch conductor $v$ and at its free end bears lightly upon the armature at a point of the heavier arm $o$ thereof quite close to the center $h^4$. Thus when the relay is excited by the passage through its coils of an appropriate current its armature $r$ swings into a position wherein its curved ends more nearly face the pole-pieces and in doing so slightly raises the spring $q$ and establishes contact between the points $r^2$ and $r^5$. Such a relay has been made and operated under the terms of this invention. It was wound with twelve thousand five hundred turns of No. 39 silk-covered wire, giving a resistance of two thousand two hundred ohms and afforded good results. It has been found that when a relay so constructed and adjusted is placed in series with a condenser and submitted to the action of an intermittent current it will under a wide range of the frequency of the intermissions attract its armature steadily to the position wherein the end $o$ is elevated and the points $r^2\ r^5$ in contact and will maintain such position notwithstanding the recurrence of an intermission between each two emissions of current as long as the transmission of the said current continues. It is evident that this comes about by reason of the contemporaneous presence of several coöperative conditions, among which may be mentioned the number of turns and disposition of the winding, the quantity and arrangement of the iron in the core, pole-pieces, and armature, the presence of the condenser, and the mode of circuit connection. This invention is not, however, restricted to this or any other particular form of relay, and any relay capable of maintaining the steady and constant attraction of its armature during the passage of an intermittent current through its coils may be employed in place thereof.

The relay containing bridge D extends from $y$ on main conductor 2 to $z$ on main conductor 3 and, as already indicated, contains also the condenser $k$ in series with the relay. From a point 4 between point $y$ and the relay-magnet on the relay-bridges D at two of the substations (in this instance S and $S^3$) there extends a branch conductor 17 to the forward contact-stop $r^2$ of the relay, and at the other two substations $S^2$ and $S^4$ are similar connections, the point 4, from which the said branches start, being, however, there placed between the other main conductor 3 and the condenser $k$.

V at station S and $V^3$, $V^2$, and $V^4$ at stations $S^2$, $S^3$, and $S^4$, respectively, are normally-open or disconnected branches, each containing the polarized call-bell of its own station and constituted, as shown, of a portion 17, united to the line conductor, and in each station extending to the front stop $r^2$, and a portion $v$, extending from the earth or ground connection $E^2$ through the magnet-coils of the bell B, conductor $v^2$, and the relay-armature $r$, (or its equivalent spring $q$ in Fig. 2,) carrying the contact-point $r^5$. The said earth branch V is normally discontinuous between the armature-point $r^5$ and front stop $r^2$, because the armature is normally retracted; but when by the passage of an intermittent current through the main conductor the relay R becomes excited and attracts its armature $r$ the said two points are brought into contact and the earth branch containing the polarized bell is closed to its own main conductor and can now be rung by the action of the said intermittent current if of proper direction. The relay-armatures are therefore to be considered as switches controlling the call-bell earth branches and adapted to temporarily unite them to the prearranged main conductors.

If the armatures of the bells B at the several substations were left without bias or adjustment, they would be adapted to operate vigorously in response to alternating currents; but as the currents to which they are desired to respond are intermittent currents and as of the two stations associated conductively when their earth branches are closed with each line one is required to respond to intermittent currents of plus and the other to intermittent currents of minus sign it is necessary to so adjust or bias the bell-magnets or their armatures that neither shall be able to respond and ring its bell with a current of sign appropriated to the other. Accordingly it is assumed that the bell B at station S is to be operated only by an intermittent current of plus-sign or positive direction transmitted from the central station C over the metallic-circuit main conductor 2, and in order that this may be done the spring $b^3$ is arranged to press upon one end of the armature $b$ of the said bell and to hold it in the position to which, if left free, it would be attracted by currents of minus-sign. When, therefore, an intermittent current of minus-sign is transmitted over the said main conductor 2, the said armature at station S will remain quiescent, because although its relay-armature is attracted and the earth branch V containing its actuating-magnet thereby closed, a minus-current impulse can do no more than hold it where it is; but a plus-current impulse will attract the other end of the armature against the force of the biasing spring $b^3$, rocking it on its center and causing its hammer to forcibly strike the gongs $b^2$. Moreover, a succession of such plus impulses will produce a succession of such oscillations and the bell will be rung continuously until the application of the current to the main line ceases. The bell at station $S^3$, though also in a branch $V^2$ from the same main conductor 2, is oppositely biased by its armature-spring $b^3$. It therefore refuses to respond to plus-current impulses, and requires for its operation the transmission of an intermittent current of minus-sign or negative direction over the same main-line conductor 2. In like manner the armatures of the bell-magnets of stations $S^2$ and $S^4$ are provided with biasing springs adjusted oppositely, and these bells are thereby adapted to respond, respectively, to plus and minus intermittent currents transmitted over the main-line conductor 3.

G at the central station represents a suitable source of current designed to develop and to deliver to the supply-conductors Q and W intermittent currents of positive and negative direction, respectively, the said conductors being both in different positions of the generating-armature, united to one terminal of the winding thereof by means of their brush-springs $x$ $x^2$, which press upon the analyzing-commutator $e$. The said commutator is made with a non-conducting portion $e^3$ and a conducting portion $e^2$, each portion passing under the brushes $x$ $x^2$ once in each revolution. The armature-winding has one terminal attached to the said conducting portion and the other to the metal projecting piece $e^4$, on which the brush-spring $x^3$, to which the permanent ground connection 21 is attached, continuously presses. The brushes $x$ $x^2$ are so adjusted that the former is in connection with the commutator-conductor during the development of the positive and the latter during the development of the negative impulse of the generator.

K $K^2$ $K^3$ $K^4$ are signaling-keys placed in front of the operator, and by a switch, as $s$, they may be switched to any plug P to ring any bell of the circuit L within whose switch-socket the plug is placed. They may be operated by the buttons X $X^2$ $X^3$ $X^4$, and each corresponds with and controls the bell of one station. The springs of the said keys are all marked 25 and 27 and connect with the keyboard and plug-circuit wires 10 and 12, and thereby with the main conductors 2 and 3, respectively. To make the keyboard-circuit continuous and at the same time to give each key the proper control over it, the springs 25 and 27 of the keys normally press on the contact-points 26 and 28, respectively, except that spring 27 of key $K^3$ presses normally on an earth-contact 22 and that the key $K^4$, which has but one active spring 25, (since the keyboard-circuit does not need to continue farther,) has no normal connection with a contact-point. The earth connection $E^4$ branches into the three first keys, passing in each to one of the operative contact-points 22, and in key $K^3$, as before stated, it passes likewise to the resting-contact to furnish the return ground connection for key $K^4$. The positive supply-conductor Q branches into keys K and $K^2$ and the negative supply-conductor W into keys $K^3 K^4$. If the plug P be placed in either switch-socket and the switch $s$ be properly placed, the bell B at substation S will be rung by pressing the button X of key K. This operation separates the springs 25 27, representing the main conductors, from the points 26 28, thus disconnecting the keyboard extension-circuits, bringing spring 25 into contact with the ground-connection point 22 and spring 27 into contact with the terminal point 23 of the positive-impulse-supply conductor Q. Main conductor 2 is thus connected with a dead-ground or an earth connection whose resistance is negligible at the central station and main conductor 3 is connected with the supply-conductor Q. Consequently an intermittent plus current is transmitted over main conductor 3 and the main conductor 2 furnishes a return therefor, having an electrostatic connection therewith through the condensers $k$ in the several station-bridges. A metallic electrostatic circuit for the relays R at all stations is thus completed, and the intermittent current pulsating therein actuates all of the said relays, which thereupon attract their armatures, and thus bring the station earth branches into direct conductive connection with the main wires 2 and 3, respectively; but though all of the relays operate the bell B at station S is alone operated, the key K having selected it to the exclusion of the others. The intermittent plus impulses thrown on conductor 3 pass to the earth branch at station S and through the magnet of bell B to earth $E^2$. This bell being biased to respond by the oscillation or vibration of its armature to broken plus currents rings continuously as long as the key-pressure is sustained; but the bell at station $S^2$ does not ring, because, though the current passes through its magnet-coils, its effect is such as to reinforce the biasing-spring $b^3$, the bell at this station being adjusted or biased to respond to broken negative impulses only, and the bells B at stations $S^2$ and $S^4$ do not ring, because by the connection with the earth established in the key K between the spring 25 and the point 22 a shunt of extremely-low resistance has been formed round the high-resistance magnets of the bells B at the said stations, for the intermittent currents or current impulses developed in the return portion of the metallic main circuit L through the condensers $k^2$ and $k^4$ at stations $S^2$ and $S^4$ on reaching the junction-points 4 have two paths before them—one of high resistance to earth through the station bell-magnet and the other of low resistance to earth at the central station by way of main wire 2, socket-spring $j^2$, plug-conductor $p$, switch-cord conductor 10, point 22, and ground-wire $E^4$. The bells B at the stations $S^2$ $S^4$ are thus short-circuited, and for this reason they also remain inoperative. When the key $K^3$ is operated, minus impulses are transmitted over main conductor 3 and the bell at station $S^3$ rings, the bell at station S being responsive to plus currents only and those at stations $S^2$ and $S^4$ being shunted as before, and in the same manner the keys $K^2$ and $K^4$ will, when operated, cause the bells at stations $S^2$ and $S^4$ to selectively ring by transmitting plus and minus currents over the main conductor 2, the current adapted for either being of direction opposed to the operation of the other and the shunt in both cases being established about the bell-magnets at stations S and $S^3$.

The discharge of the condenser $k$ takes place in the arrangement so far described, through the electromagnet of the bell B. It necessarily, therefore, is not as strong as the charging impulse which reaches the condenser directly from the main line. While the arrangement under these conditions works satisfactorily, there is a wide range of individuality in bell-magnets, and to insure successful operation under all conceivable conditions we have devised and arranged means for grounding the line over which the intermittent current is being transmitted on and during the intermissions of said current, so that a circuit of low resistance is provided for the discharge impulse from the condenser through the relay. By this means the impulse is much stronger and the retention of magnetization more complete. The said means is illustrated by Fig. 3. It comprehends two back contact-stops $x^5$ $x^6$ for the brushes $x$ $x^2$, respectively, which form the source terminals of the supply-conductors Q and W, the formation of the non-conducting portion $e^3$ of the analyzing-commutator $e$, with a larger radius than that of the conducting portion $e^2$, and a connection from earth E to both back-stops by the conductor 22. Thus the line conductor, which at any time through the intermediation of one of the supply-conductors and the operation of the appropriate key receives the intermittent current impulses from the generator G while the conducting portion $e^2$ of the commutator is passing under the brush of the said supply-conductor, is grounded during the intermissions of said current, when the larger non-conducting portion $e^3$ passing under the same brush presses it against the back-stop $x^5$ or $x^6$, as the case may be.

Having now fully set forth the structure, arrangement, and the mode in which the invention is operated, we claim—

1. In a telephone signaling system and apparatus, the combination with a metallic or double-conductor main circuit; and means for transmitting an intermittent current of definite direction over one of the conductors thereof; of a bridge of said circuit containing a condenser, and a relay responsive to such a current and adapted to maintain the steady attraction of its armature during the passage thereof; a normally-disconnected earth branch controlled by the said armature, and united during the attracted position thereof to the said main-circuit conductor; and a polarized bell having its magnet in the said earth branch, and having its armature biased to move in one direction with each emission, and oppositely with each intermission of the said current.

2. The combination in a telephone-signaling system, of a metallic or double-conductor main circuit; and a source of intermittent current of definite direction connecting with one of the conductors thereof; with a subscriber's signaling apparatus comprising a bridge between the main conductors of said circuit; a condenser, and a relay in the said bridge, the latter organized to attract its armature and to steadily maintain the attraction thereof during the passage over the said main conductor of the said intermittent current; a ground branch of the said main conductor normally disconnected therefrom, but brought into direct connection therewith by the action of the said relay-armature when attracted; and a polarized bell having its magnet in said branch, and its armature biased or adjusted to vibrate in response to the said main-line current of single direction; whereby the temporary connection of the ground branch, and a continuous ringing of the polarized bell included therein, may both be effected by the same intermittent current of the said source, acting through the steadily-attracted relay-armature, and the intermittently-attracted bell-armature; substantially as set forth.

3. The combination of a metallic telephone-circuit extending between a central station and two substations; a ground branch at each substation extending from one of the main-circuit conductors, but normally detached therefrom; a sluggish or slow-acting neutral switching-relay as indicated, at each substation, bridged in series with a condenser between the main conductors of said circuit, and adapted on the excitement of its magnet to switch the said ground branch into connection with the appropriate main conductor; a polarized bell, biased or adjusted to respond to intermittent currents of definite direction in one, and a similar bell oppositely polarized or oppositely biased to respond to like intermittent currents of opposite direction in the other of said ground branches; and means at the central station for impressing upon the said appropriate main conductor, intermittent currents of either direction, for the selective operation of either bell.

4. In a telephone system, a metallic main circuit extending between a central station and two substations; a slow-acting neutral switching-relay responsive by the protracted attraction of its armature to the passage through its coils of an intermittent current, connected serially with a condenser in a bridge at each substation between the two conductors of said main circuit; normally-discontinuous earth branches, one at each substation, extending from the said main-circuit conductors respectively, and each including a polarized electromagnetic bell responsive by the vibration of its armature to an intermittent current, the said earth branches being each adapted for connection with its own main conductor by the operation of the switching-relay at the same station; and means at the central station for transmitting an intermittent current over either main conductor of said metallic circuit, and for simultaneously grounding the other main conductor; substantially as and for the purpose set forth.

5. A system of selective signaling, comprising a main metallic telephone-circuit extending to four substations; a bridge at each substation containing a slow-acting neutral switching-relay, and a condenser; a normally detached and discontinuous earth branch at each substation, two of the said branches being associated with one, and two with the other of the main conductors of said metallic circuit, and all adapted to be switched into direct connection with their respective main conductors by the action of their respective relays; a polarized bell in each earth branch, those associated with the same main conductor being biased or adjusted oppositely, and thereby made respectively responsive to intermittent currents of opposite direction respectively transmitted over the said conductor; and means as indicated at the central station for transmitting an intermittent current of either direction over either main conductor, and for simultaneously establishing a shunt of relatively-low resistance around the bell-magnets associated with the other main conductor; whereby in a circuit having no permanently-connected earth branches, either substation-bell may be selectively operated, to the exclusion of the others.

6. The combination of the two main conductors of a metallic telephone-circuit having four substations; with two normally-disconnected ground branches located at two of said substations and adapted for direct connection with one of the said main conductors, each branch containing an oppositely-polarized or oppositely-biased electromagnetic call-bell; two other ground branches similarly detached from but adapted for connection with the other main conductor, and respectively containing the oppositely-biased bells of the other stations; a normally-open shunt, of resistance low relatively to that of the bell-magnets, around each such bell-magnet, means for uniting all of the said earth branches to their respective main conductors when a current adapted for the operation of any of the bells is transmitted over either main conductor; and means at the central station for closing the shunt-circuit of the two bells of either main conductor, when an intermittent current adapted for the operation of either of the two bells of the other main conductor is transmitted over the said other main conductor; substantially as described.

7. In a system of selective signals for a telephone-circuit, the combination of a normally-groundless double-conductor main circuit extending between a central station and four substations; a normally-detached earth branch at each substation, two of them being associated with one conductor, and two with the other conductor of said main circuit; a slow-acting neutral switching-relay at each substation, bridged in series with a condenser between the conductors of said main circuit, all of the said relays being responsive to intermittent currents of either direction over either main conductor, and adapted when excited thereby to attract and maintain the attraction of their armatures, which constitute switches to temporarily unite the earth branches at their respective stations to the prearranged main conductors; a polarized electromagnetic bell connected in the earth branch of earth substation, those in the two branches of either main conductor being oppositely biased or adjusted to respond to intermittent currents of opposite direction respectively; a source of signaling-current at the central station having one pole grounded, and organized to deliver intermittent currents of plus and minus direction respectively to different terminal conductors; an independent earth connection at said central station; and a signaling-key at the said central station for each substation-bell, adapted when operated to connect the main conductor thereof with the appropriate source terminal, and the other main conductor with the said independent earth connection; whereby an intermittent current of definite direction may be transmitted over a particular main conductor for the selective operation of the corresponding substation-bell, and of the relays at all stations, the two bells of the other main conductor being shunted by the said independent earth connection.

8. In a telephone signaling system and apparatus, the combination with either main conductor of a metallic telephone-line circuit; of a normally-disconnected earth branch at a substation; a polarized bell biased to respond to an intermittent current of definite direction and having its electromagnet included in said branch; a bridge of the main circuit at said station including a condenser, and a relay controlling the connection of said earth branch with the main circuit, and adapted to establish the same on the attraction of its armature; means at a central station for transmitting the said intermittent current over said main conductor for the operation of said relay and bell; and a grounding device automatically applied to said main conductor during the intermissions of said current; substantially as set forth.

In testimony whereof we have signed our names to this specification, in the presence of two subscribing witnesses, this 13th day of July, 1899.

GEORGE K. THOMPSON.
ERNEST C. ROBES.

Witnesses:
GEO. WILLIS PIERCE,
FRANK C. LOCKWOOD.

It is hereby certified that in Letters Patent No. 644,647, granted March 6, 1900, upon the application of George K. Thompson, of Malden, and Ernest C. Robes, of Medford, Massachusetts, for an improvement in "Selection Signals for Telephone-Circuits," an error appears in the printed specification requiring correction, as follows: In line 123, page 6, the word "earth" should read *each;* and that the said Letters Patent should be read with this correction therein that the same may conform to the record of the case in the Patent Office.

Signed, countersigned, and sealed this 20th day of March, A. D., 1900.

[SEAL.]

THOS. RYAN,
*First Assistant Secretary of the Interior.*

Countersigned:
C. H. DUELL,
*Commissioner of Patents.*